United States Patent
Yamada et al.

(10) Patent No.: US 8,292,009 B2
(45) Date of Patent: Oct. 23, 2012

(54) POWER SUPPLY DEVICE AND VEHICLE INCLUDING THE SAME, CONTROL METHOD FOR POWER SUPPLY DEVICE, AND COMPUTER-READABLE RECORDING MEDIUM HAVING PROGRAM FOR CAUSING COMPUTER TO EXECUTE THAT CONTROL METHOD RECORDED THEREON

(75) Inventors: Kenji Yamada, Toyota (JP); Hideto Hanada, Toyota (JP); Satoru Katoh, Nisshin (JP); Hideaki Saida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 295 days.

(21) Appl. No.: 12/681,259

(22) PCT Filed: Sep. 26, 2008

(86) PCT No.: PCT/JP2008/067424
§ 371 (c)(1),
(2), (4) Date: Apr. 1, 2010

(87) PCT Pub. No.: WO2009/050997
PCT Pub. Date: Apr. 23, 2009

(65) Prior Publication Data
US 2010/0224428 A1    Sep. 9, 2010

(30) Foreign Application Priority Data

Oct. 16, 2007  (JP) .................................. 2007-269196
Jan. 31, 2008  (JP) .................................. 2008-021535

(51) Int. Cl.
*B60K 1/00*  (2006.01)

(52) U.S. Cl. .................................. 180/65.1; 180/65.21
(58) Field of Classification Search ................ 180/54.1, 180/65.1, 65.29, 65.21
See application file for complete search history.

(56) References Cited

U.S. PATENT DOCUMENTS

| 5,495,908 | A | * | 3/1996 | Obara et al. | ................. 180/65.8 |
| 5,887,670 | A | * | 3/1999 | Tabata et al. | ............... 180/65.25 |
| 5,907,194 | A | * | 5/1999 | Schenk et al. | ............... 307/10.1 |

(Continued)

FOREIGN PATENT DOCUMENTS

JP    A-2000-324871    11/2000

(Continued)

OTHER PUBLICATIONS

International Search Report issued in Application No. PCT/JP2008/067424; Mailed on Dec. 16, 2008 (With Translation).

(Continued)

*Primary Examiner* — J. Allen Shriver, II
*Assistant Examiner* — Bridget Avery
(74) *Attorney, Agent, or Firm* — Oliff & Berridge, PLC

(57) ABSTRACT

When request power required of a power supply device by a driving force generation unit is close to zero, a converter ECU controls first and second converters to prohibit respective amounts of current passage in the first and second converters from simultaneously becoming close to zero. That is, when the request power is close to zero, the converter ECU performs voltage control of the first converter and sets an electric power control value for the second converter subjected to current control (electric power control) to a nonzero value, such that electric power is supplied and received between the first and second converters.

12 Claims, 10 Drawing Sheets

U.S. PATENT DOCUMENTS

| | | | |
|---|---|---|---|
| 2003/0107352 A1* | 6/2003 | Downer et al. | 322/40 |
| 2009/0145675 A1* | 6/2009 | Ichikawa | 180/65.1 |
| 2009/0314558 A1* | 12/2009 | Ang et al. | 180/65.1 |
| 2010/0001583 A1* | 1/2010 | Ichikawa | 307/10.1 |
| 2010/0019728 A1* | 1/2010 | Ichikawa et al. | 320/134 |
| 2010/0026237 A1* | 2/2010 | Ichikawa et al. | 320/109 |

FOREIGN PATENT DOCUMENTS

| | | |
|---|---|---|
| JP | A-2003-209969 | 7/2003 |
| JP | A-2003-235252 | 8/2003 |
| JP | A-2004-042799 | 2/2004 |
| JP | A-2007-143320 | 6/2007 |
| JP | A-2007-215381 | 8/2007 |

OTHER PUBLICATIONS

Written Opinion of the International Searching Authority issued in Application No. PCT/JP2008/067424; Mailed on Dec. 16, 2008 (With Translation).

International Preliminary Report on Patentability issued in Application No. PCT/JP2008/067424; Mailed on Dec. 16, 2008 (With Translation).

Japanese Office Action issued in Application No. 2008-021535; Mailed on Dec. 16, 2008 (With Translation).

Japanese Office Action issued in Application No. 2008-021535; Mailed on Apr. 21, 2009 (With Translation).

Japanese Office Action issued in Application No. 2008-021535; Mailed on Sep. 1, 2009 (With Translation).

Nov. 28, 2011 European Search Report issued in Application No. 08838578.6.

Di Napoli et al., "Control strategy for multiple input DC-DC power converters devoted to hybrid vehicle propulsion systems," Industrial Electronics, 2002. ISIE 2002. Proceedings of the 2002 IEEE International Symposium on Jul. 8-11, 2002, NJ, USA, IEEE, vol. 3, Jul. 8, 2002, pp. 1036-1041.

* cited by examiner

FIG.2
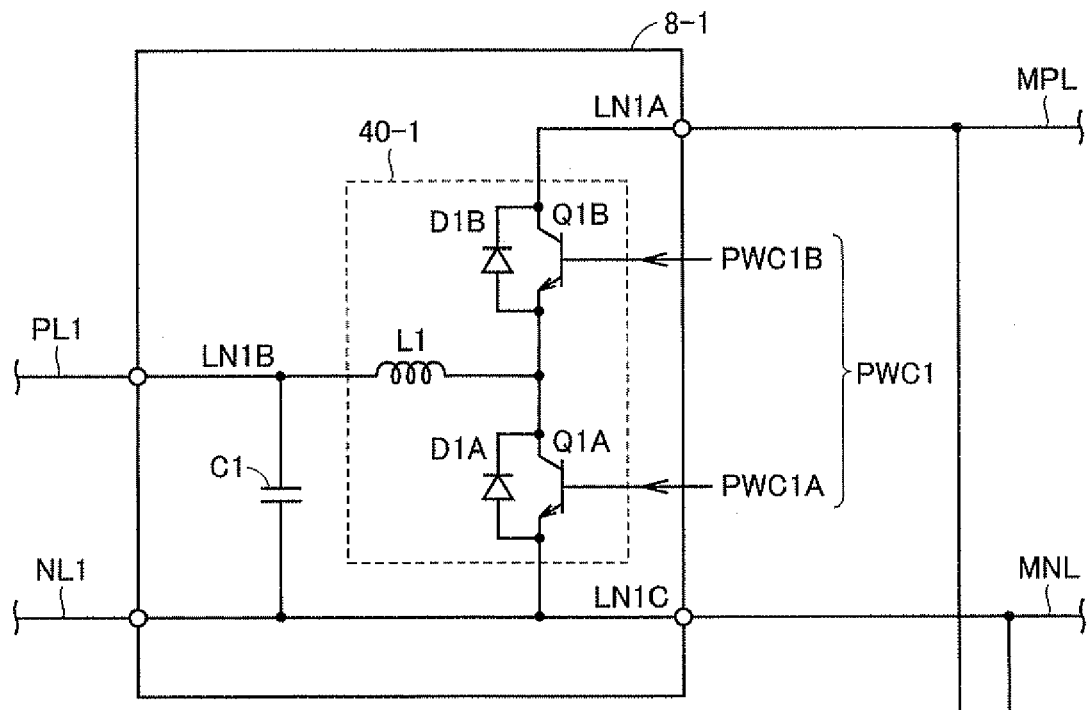
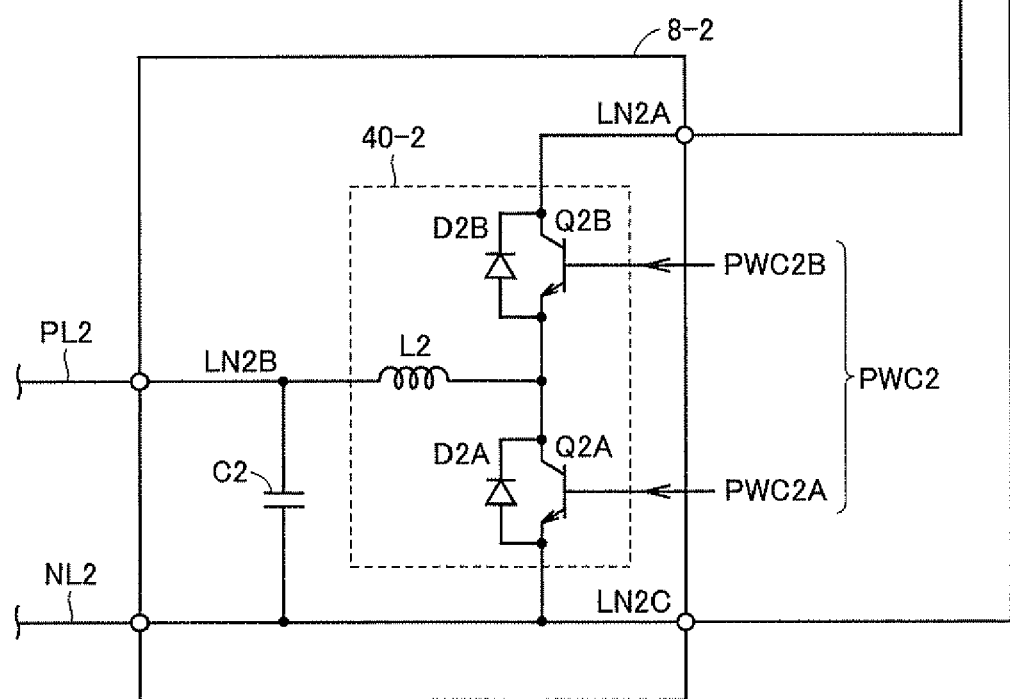

POWER SUPPLY DEVICE AND VEHICLE INCLUDING THE SAME, CONTROL METHOD FOR POWER SUPPLY DEVICE, AND COMPUTER-READABLE RECORDING MEDIUM HAVING PROGRAM FOR CAUSING COMPUTER TO EXECUTE THAT CONTROL METHOD RECORDED THEREON

TECHNICAL FIELD

The present invention relates to a control technique for suppressing variation in an output voltage of a power supply device including a plurality of power storage units that can be charged and discharge and a plurality of voltage conversion units provided correspondingly thereto.

BACKGROUND ART

In recent years, capacity of a power supply device has been increased in vehicles having a motor as a driving source mounted thereon such as hybrid vehicles and electric vehicles, in order to improve acceleration performance and travel performance such as a distance that can be traveled. There have been proposed structures including a plurality of power storage units as means for increasing capacity of a power supply device.

For example, Japanese Patent Laying-Open No. 2003-209969 (Patent Document 1) discloses a power supply control system including a plurality of power supply stages. This power supply control system includes a plurality of power supply stages which are connected in parallel to one another and supply DC power to at least one inverter. Each power supply stage includes a battery and a boost/buck DC-DC converter having a DC chopper circuit.

In this power supply control system, the plurality of power supply stages are controlled such that the plurality of batteries included in the plurality of power supply stages, respectively, are charged and discharge evenly to maintain output voltage to the inverter (see Patent Document 1).
Patent Document 1: Japanese Patent Laying-Open No. 2003-209969

DISCLOSURE OF THE INVENTION

Problems to be Solved by the Invention

In such a boost/buck DC-DC converter (hereinafter also simply referred to as a "converter") as disclosed in the above Japanese Patent Laying-Open No. 2003-209969, dead time in consideration of OFF delay time of a boost switch and a buck switch is usually provided in order to prevent a short circuit resulting from simultaneous turn-on of the switches.

Even during a dead time period over which the boost switch and the buck switch are simultaneously turned off, however, a current flows through a diode connected in antiparallel to each switch, which causes deviation of duty of the converter with respect to a command by the dead time. More specifically, when a current is flowing from a battery toward the converter, the current flows through a diode connected in antiparallel to the buck switch (upper arm) during the dead time period, causing deviation of duty of the converter with respect to a command such that the voltage decreases. When a current is flowing from the converter toward the battery, on the other hand, the current flows through a diode connected in antiparallel to the boost switch (lower arm) during the dead time period, causing deviation of duty of the converter with respect to a command such that the voltage increases.

An amount of the deviation of duty due to this dead time is corrected by feedback (FB) control. When a direction of the current flowing through the converter is reversed, however, a direction of the deviation of duty is reversed, so that an output voltage of the converter (input voltage to the inverter) is varied due to following delay of the FB control.

Further, in an example where a plurality of converters are connected in parallel as disclosed in the above Japanese Patent Laying-Open No. 2003-209969, when request power required by an inverter side becomes close to zero so that amounts of current passage in the plurality of converters simultaneously become close to zero, the aforementioned voltage variations that occur in the plurality of converters are combined with one another, causing output voltages of the converters (input voltages to the inverter) to be varied significantly.

Accordingly, the present invention was made in order to solve such problems, and an object thereof is to provide a power supply device including a plurality of power storage units and a plurality of voltage conversion units and capable of suppressing variation in an output voltage thereof, and a vehicle including the power supply device.

Another object of the present invention is to provide a control method capable of suppressing variation in an output voltage in the power supply device including the plurality of power storage units and the plurality of voltage conversion units, and a computer-readable recording medium having a program for causing a computer to execute the control method recorded thereon, Means for Solving the Problems According to the present invention, a power supply device is a power supply device for supplying and receiving electric power to and from a load device via an electric power line, and includes a plurality of power storage units that can be charged and discharge, a plurality of voltage conversion units, a control unit, and a command generation unit. The plurality of voltage conversion units are provided correspondingly to the plurality of power storage units, and each of the voltage conversion units includes a DC chopper circuit capable of performing bidirectional voltage conversion between a corresponding one of the power storage units and the electric power line. The control unit controls the plurality of voltage conversion units in accordance with a given command. The command generation unit generates the command to prohibit respective amounts of current passage in the plurality of voltage conversion units from simultaneously becoming equal to or lower than a prescribed value.

Preferably, when request power required of the power supply device by the load device is equal to or lower than a reference value, the command generation unit generates the command to prohibit the amounts of current passage in the voltage conversion units from simultaneously becoming equal to or lower than the prescribed value, Still preferably, when the request power is equal to or lower than the reference value, the command generation unit generates the command such that electric power is supplied and received among the plurality of power storage units.

Still preferably, the power supply device further includes a state-of-charge estimation unit for estimating a state of charge of each of the plurality of power storage units. The command generation unit generates the command such that electric power flows from the power storage unit relatively high in a state amount indicating the state of charge to the power storage unit relatively low in the state amount.

Preferably, the command generation unit generates the command such that the respective amounts of current passage in the plurality of voltage conversion units are different from one another.

Further, according to the present invention, a vehicle includes any power supply device described above, a driving device, a motor, and a wheel. The driving device receives supply of electric power from the power supply device. The motor is driven by the driving device. The wheel is driven by the motor.

Moreover, according to the present invention, a control method for a power supply device is a control method for a power supply device for supplying and receiving electric power to and from a load device via an electric power line. The power supply device includes a plurality of power storage units that can be charged and discharge, and a plurality of voltage conversion units. The plurality of voltage conversion units are provided correspondingly to the plurality of power storage units, and each of the voltage conversion units includes a DC chopper circuit capable of performing bidirectional voltage conversion between a corresponding one of the power storage units and the electric power line. The control method includes a command generation step and a control step. At the command generation step, a command to each of the plurality of voltage conversion units is generated to prohibit respective amounts of current passage in the plurality of voltage conversion units from simultaneously becoming equal to or lower than a prescribed value. At the control step, the plurality of voltage conversion units are controlled in accordance with the command generated at the command generation step.

Preferably, the control method for a power supply device further includes a determination step. At the determination step, it is determined whether or not request power required of the power supply device by the load device is equal to or lower than a reference value. When it is determined at the determination step that the request power is equal to or lower than the reference value, the command is generated at the command generation step to prohibit the respective amounts of current passage in the voltage conversion units from simultaneously becoming equal to or lower than the prescribed value.

Still preferably, when it is determined at the determination step that the request power is equal to or lower than the reference value, the command is generated at the command generation step such that electric power is supplied and received among the plurality of power storage units.

Still preferably, the control method for a power supply device further includes the step of estimating a state of charge of each of the plurality of power storage units. At the command generation step, the command is generated such that electric power flows from the power storage unit relatively high in a state amount indicating the state of charge to the power storage unit relatively low in the state amount.

Preferably, at the command generation step, the command is generated such that the respective amounts of current passage in the plurality of voltage conversion units are different from one another.

Furthermore, according to the present invention, a recording medium is a computer-readable recording medium having recorded thereon a program for causing a computer to execute the control method for any power supply device described above.

Effects of the Invention

In the present invention, a command to a plurality of voltage conversion units is generated to prohibit respective amounts of current passage in the plurality of voltage conversion units from simultaneously becoming equal to or lower than a prescribed value, thereby preventing the respective amounts of current passage in the plurality of voltage conversion units from simultaneously becoming close to zero.

Therefore, according to the present invention, variation in an output voltage of a power supply device including a plurality of power storage units and a plurality of voltage conversion units can be suppressed.

BRIEF DESCRIPTION OF THE DRAWINGS

FIG. 2 is a schematic configuration diagram of converters shown in FIG. 1.

Figure 1:
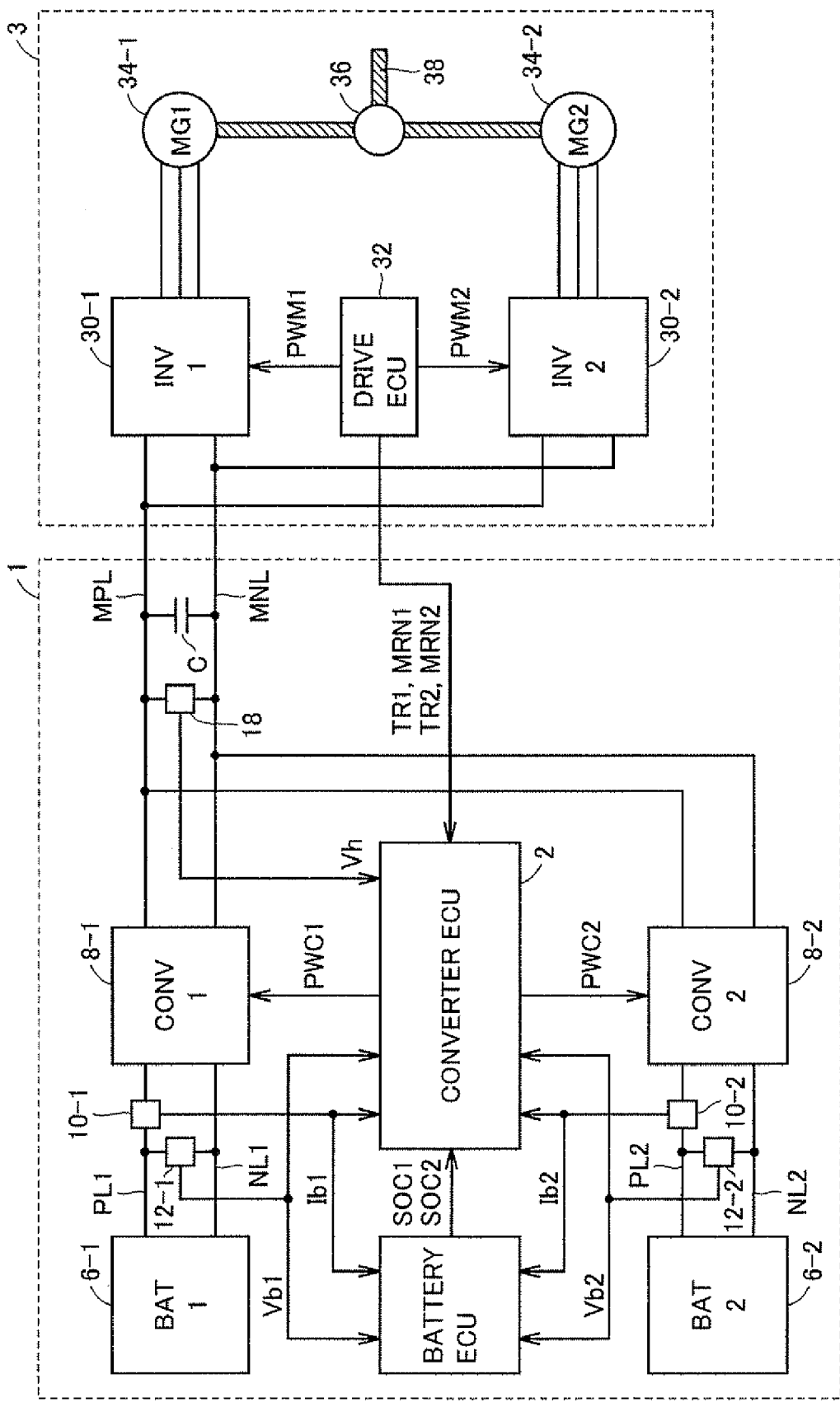
FIG. 1 is a general block diagram of a vehicle having a power supply device mounted thereon according to a first embodiment of the present invention.

DESCRIPTION OF THE REFERENCE SIGNS 1 power supply device; 2 converter ECU; 3 driving force generation unit; 4 battery ECU; 6-1 to 6-3 power storage unit; 8-1 to 8-3 converter; 10-1, 10-2 current sensor; 12-1, 12-2, 18 voltage sensor; 30-1, 30-2 inverter; 32 drive ECU; 34-1, 34-2 motor generator; 36 power transmission mechanism; 38 drive shaft; 40-1, 40-2 chopper circuit; 70 command generation unit; 71 division unit; 72-1 voltage control unit; 72-2 current control unit; 74-1, 74-2, 78-1, 78-2 subtraction unit; 76-1, 76-2 PI control unit; 80-1, 80-2 modulation unit; 100, 100A vehicle; MPL main positive bus; MNL main negative bus; C, C1, C2 smoothing capacitor; PL1, PL2 positive electrode line; NL1, NL2 negative electrode line; LN1A, LN2A positive bus; LN1B, LN2B line; LN1C, LN2C negative bus; Q1A, Q1B, Q2A, Q2B transistor; D1A, D1B, D2A, D2B diode; L1, L2 inductor.

BEST MODES FOR CARRYING OUT THE INVENTION

Embodiments of the present invention will be described hereinafter in detail with reference to the drawings. It is noted that the same or corresponding elements have the same reference characters allotted in the drawings, and description thereof will not be repeated.

[First Embodiment]

FIG. 1 is a general block diagram of a vehicle having a power supply device mounted thereon according to a first embodiment of the present invention. Referring to FIG. 1, this vehicle 100 includes a power supply device 1 and a driving force generation unit 3. Driving force generation unit 3 includes inverters 30-1, 30-2, motor generators 34-1, 34-2, a power transmission mechanism 36, a drive shaft 38, and a drive ECU (Electronic Control Unit) 32.

Inverters 30-1, 30-2 are connected to a main positive bus MPL and a main negative bus MNL. Inverters 30-1, 30-2 convert driving electric power (DC power) supplied from power supply device 1 into AC power, and output the AC power to motor generators 34-1, 34-2, respectively. Inverters 30-1, 30-2 also convert AC power generated by motor generators 34-1, 34-2, respectively, into DC power, and output the DC power to power supply device 1 as regenerative electric power.

Each of inverters 30-1, 30-2 includes a bridge circuit including switching elements of three phases, for example. Inverters 30-1, 30-2 perform switching operation in response to drive signals PWM1, PWM2 from drive ECU 32, respectively, to drive corresponding motor generators.

Motor generators 34-1, 34-2 receive the AC power supplied from inverters 30-1, 30-2, respectively, to generate rotational driving force. Motor generators 34-1, 34-2 also receive rotation power from outside to generate AC power. Motor generators 34-1, 34-2 each include, for example, a three-phase AC rotating electric machine including a rotor in which a permanent magnet is buried. Motor generators 34-1, 34-2 are coupled to power transmission mechanism 36, and the rotational driving force is transmitted via drive shaft 38 further coupled to power transmission mechanism 36 to wheels (not shown).

If vehicle 100 is a hybrid vehicle including an engine, motor generators 34-1, 34-2 are coupled to the engine (not shown) as well via power transmission mechanism 36 or drive shaft 38. Then, drive ECU 32 performs control such that a ratio between driving force generated by the engine and driving force generated by motor generators 34-1, 34-2 is optimal. Any one of motor generators 34-1 and 34-2 may exclusively function as a motor, and the other motor generator may exclusively function as a power generator.

Drive ECU 32 calculates torque target values TR1, TR2 and revolution speed target values MRN1, MRN2 of motor generators 34-1, 34-2 based on detected signals from not-shown sensors, travel conditions, an accelerator position, and the like. Then, drive ECU 32 produces drive signal PWM1 to control inverter 30-1 such that generated torque and the revolution speed of motor generator 34-1 attain to torque target value TR1 and revolution speed target value MRN1, respectively, and produces drive signal PWM2 to control inverter 30-2 such that generated torque and the revolution speed of motor generator 34-2 attain to torque target value TR2 and revolution speed target value MRN2, respectively. In addition, drive ECU 32 outputs calculated torque target values TR1, TR2 and revolution speed target values MRN1, MRN2 to a converter ECU 2 (which will be described later) in power supply device 1.

Power supply device 1 includes power storage units 6-1, 6-2, converters 8-1, 8-2, a smoothing capacitor C, converter ECU 2, a battery ECU 4, current sensors 10-1, 10-2, and voltage sensors 12-1, 12-2, 18.

Power storage units 6-1, 6-2 are DC power supplies that can be charged and discharge, and each include a secondary battery such as a nickel-metal hydride secondary battery or a lithium-ion secondary battery. Power storage unit 6-1 is connected to converter 8-1 via a positive electrode line PL1 and a negative electrode line NL1, and power storage unit 6-2 is connected to converter 8-2 via a positive electrode line PL2 and a negative electrode line NL2.

Converter 8-1 is provided between power storage unit 6-1 and main positive bus MPL, main negative bus MNL, and performs voltage conversion between power storage unit 6-1 and main positive bus MPL, main negative bus MNL based on a drive signal PWC1 from converter ECU 2. Converter 8-2 is provided between power storage unit 6-2 and main positive bus MPL, main negative bus MNL, and performs voltage conversion between power storage unit 6-2 and main positive bus MPL, main negative bus MNL based on a drive signal PWC2 from converter ECU 2.

Smoothing capacitor C is connected between main positive bus MPL and main negative bus MNL, and reduces components of electric power variation included in main positive bus MPL and main negative bus MNL. Voltage sensor 18 detects a voltage Vh between main positive bus MPL and main negative bus MNL, and outputs the detected value to converter ECU 2.

Current sensors 10-1, 10-2 detect a current Ib1 input and output to/from power storage unit 6-1 and a current Ib2 input and output to/from power storage unit 6-2, respectively, and output corresponding detected values to converter ECU 2 and battery ECU 4. It is noted that current sensors 10-1, 10-2 each detect a current output from a corresponding power storage unit (discharge current) as a positive value, and detect a current input to a corresponding power storage unit (charge current) as a negative value. Although current sensors 10-1, 10-2 detect currents through positive electrode lines PL1, PL2, respectively, in FIG. 1, current sensors 10-1, 10-2 may detect currents through negative electrode lines NL1, NL2, respectively. Voltage sensors 12-1, 12-2 detect a voltage Vb1 of power storage unit 6-1 and a voltage Vb2 of a power storage unit 6-2, respectively, and output corresponding detected values to converter ECU 2 and battery ECU 4.

Battery ECU 4 estimates a state amount SOC1 indicating a state of charge (hereinafter also referred to as "SOC") of power storage unit 6-1 based on the respective detected values from voltage sensor 12-1 and current sensor 10-1, and outputs estimated state amount SOC1 to converter ECU 2. Battery ECU 4 also estimates a state amount SOC2 indicating an SOC of power storage unit 6-2 based on the respective detected values from voltage sensor 12-2 and current sensor 10-2, and outputs estimated state amount SOC2 to converter ECU 2. Various kinds of known methods can be used to calculate state amounts SOC1, SOC2.

Converter ECU 2 produces drive signals PWC1, PWC2 for driving converters 8-1, 8-2, respectively, based on the detected values from current sensors 10-1, 10-2 and voltage sensors 12-1, 12-2, 18, state amounts SOC1, SOC2 from battery ECU 4, and torque target values TR1, TR2 and revolution speed target values MRN1, MRN2 from drive ECU 32. Then, converter ECU 2 outputs produced drive signals PWC1, PWC2 to converters 8-1, 8-2, respectively, to control converters 8-1, 8-2.

Moreover, converter ECU 2 calculates request power PR required by driving force generation unit 3 based on torque target values TR1, TR2 and revolution speed target values MRN1, MRN2 received from drive ECU 32. Then, converter ECU 2 produces control target values for converters 8-1, 8-2 by using a method which will be described later such that respective amounts of current passage in converters 8-1, 8-2 do not simultaneously become close to zero, and produces drive signals PWC1, PWC2 based on the produced control target values.

FIG. 2 is a schematic configuration diagram of converters 8-1, 8-2 shown in FIG. 1. The configuration and operation of converter 8-2 are similar to those of converter 8-1, and thus the configuration and operation of converter 8-1 will be described below. Referring to FIG. 2, converter 8-1 includes a chopper circuit 40-1, a positive bus LN1A, a negative bus LN1C, a line LN1B, and a smoothing capacitor C1. Chopper circuit 40-1 includes switching elements Q1A, Q1B, diodes D1A, D1B, and an inductor L1.

Positive bus LN1A has one end connected to a collector of switching element Q1B, and the other end connected to main positive bus MPL. Negative bus LN1C has one end connected to negative electrode line NL1 and the other end connected to main negative bus MNL.

Switching elements Q1A, Q1B are connected in series between negative bus LN1C and positive bus LN1A. More specifically, switching element Q1A has an emitter connected to negative bus LN1C, and switching element Q1B has the collector connected to positive bus LN1A. Diodes D1A, D1B are connected in antiparallel to switching elements Q1A, Q1B, respectively. Inductor L1 is connected between a connection node of switching elements Q1A, Q1B and line LN1B.

Line LN1B has one end connected to positive electrode line PL1 and the other end connected to inductor L1. Smoothing capacitor C1 is connected between line LN1B and negative bus LN1C, and reduces AC components included in a DC voltage between line LN1B and negative bus LN1C.

In response to drive signal PWC1 from converter ECU 2 (FIG. 1), chopper circuit 40-1 performs bidirectional DC voltage conversion between power storage unit 6-1 connected to positive electrode line PL1 and negative electrode line NL1, and main positive bus MPL and main negative bus MNL. Drive signal PWC1 includes a drive signal PWC1A for controlling ON/OFF of switching element Q1A forming a lower arm element, and a drive signal PWC1B for controlling ON/OFF of switching element Q1B forming an upper arm element. A duty ratio (a ratio between ON/OFF periods) of switching elements Q1A and Q1B within a prescribed duty cycle (a sum of the ON period and the OFF period) is controlled by converter ECU 2.

When switching elements Q1A, Q1B are controlled such that ON-duty of switching element Q1A becomes longer (ON-duty of switching element Q1B becomes shorter because switching elements Q1A, Q1B are subjected to ON/OFF control in a complementary manner except during a dead time period), an amount of pump current flowing from power storage unit 6-1 to inductor L1 is increased, which increases electromagnetic energy accumulated in inductor L1. Consequently, an amount of current discharged from inductor L1 to main positive bus MPL via diode D1B is increased at timing of transition from an ON state to an OFF state of switching element Q1A, which increases a voltage of main positive bus MPL.

On the other hand, when switching elements Q1A, Q1B are controlled such that ON-duty of switching element Q1B becomes longer (ON-duty of switching element Q1A becomes shorter), an amount of current flowing from main positive bus MPL to power storage unit 6-1 via switching element Q1B and inductor L1 is increased, which lowers a voltage of main positive bus MPL.

In this manner, by controlling the duty ratio of switching elements Q1A and Q1B, the voltage of main positive bus MPL can be controlled, and a direction of current (electric power) and the amount of current (amount of electric power) flowing between power storage unit 6-1 and main positive bus MPL can also be controlled.

Figure 3:
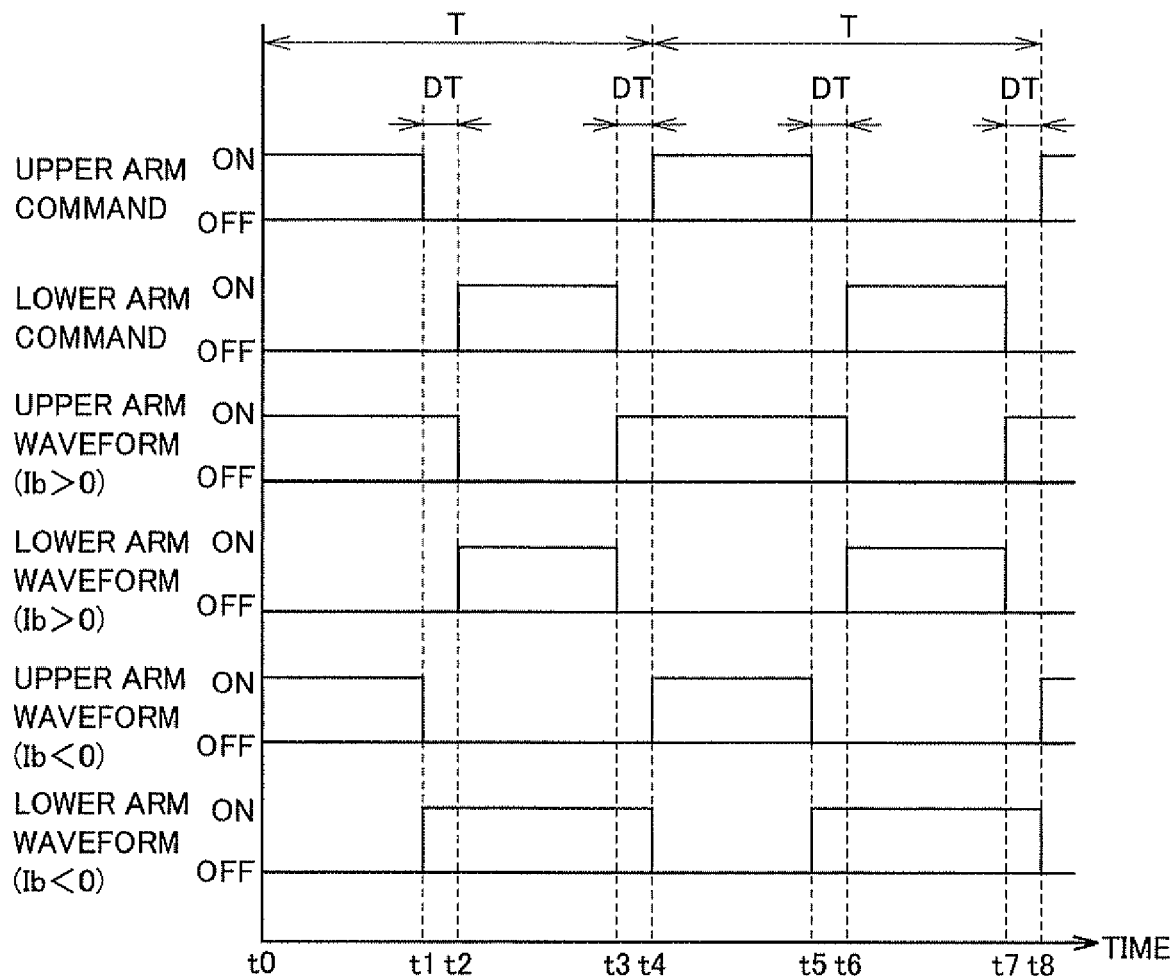
FIG. 3 is an operation waveform diagram of the converters shown in FIG. 2.

FIG. 3 is an operation waveform diagram of converters 8-1, 8-2 shown in FIG. 2. FIG. 3 representatively illustrates an operation waveform of converter 8-1, which is similar to an operation waveform of converter 8-2. In the following description, a module including switching element Q1B and diode D1B connected in antiparallel thereto is also referred to as an "upper arm," and a module including switching element Q1A and diode D1A connected in antiparallel thereto is also referred to as a "lower arm."

Referring to FIG. 3, at time t0, an ON command is output to switching element Q1B in the upper arm, and an OFF command is output to switching element Q1A in the lower arm. At time t1, an OFF command is output to the upper arm, but an ON command is not immediately output to the lower arm. At time t2 after a lapse of dead time DT provided in order to prevent a short circuit, an ON command is output to the lower arm. Thereafter, at time t3, an OFF command is output to the lower arm, and at time t4 after a lapse of dead time DT since time t3, an ON command is output to the upper arm. Subsequently, similar commands are output for each duty cycle T.

With such ON/OFF commands to the upper and lower arms, when current Ib1 is positive (when current (electric power) is flowing from power storage unit 6-1 toward converter 8-1), the current flows through diode D1B in the upper arm during the dead time period over which an OFF command is output to both of upper and lower arms. That is, when current Ib1 is positive, upon turning off of switching element Q1A in the lower arm, a current equal to the electromagnetic energy accumulated in inductor L1 flows to diode D1B in the upper arm, so that the current flows through the upper arm even during the dead time period. Accordingly, when current Ib1 is positive, the upper arm is in an ON state even during the dead time period. Namely, duty of the converter deviates with respect to a command such that the ON-duty of the upper arm becomes longer (such that the voltage decreases).

On the other hand, when a current Ib is negative (when current (electric power) is flowing from converter 8-1 toward power storage unit 6-1), the current flows through diode D1A in the lower arm during the dead time period. That is, when current Ib is negative, the current circulates via diode D1A in the lower arm even after turning off of switching element Q1B in the upper arm, so that the current flows through the lower arm even during the dead time period. Accordingly, when current Ib is negative, the lower arm is in an ON state even during the dead time period. Namely, the duty of the converter deviates with respect to a command such that the ON-duty of the lower arm becomes longer (such that the voltage increases).

Figure 4:
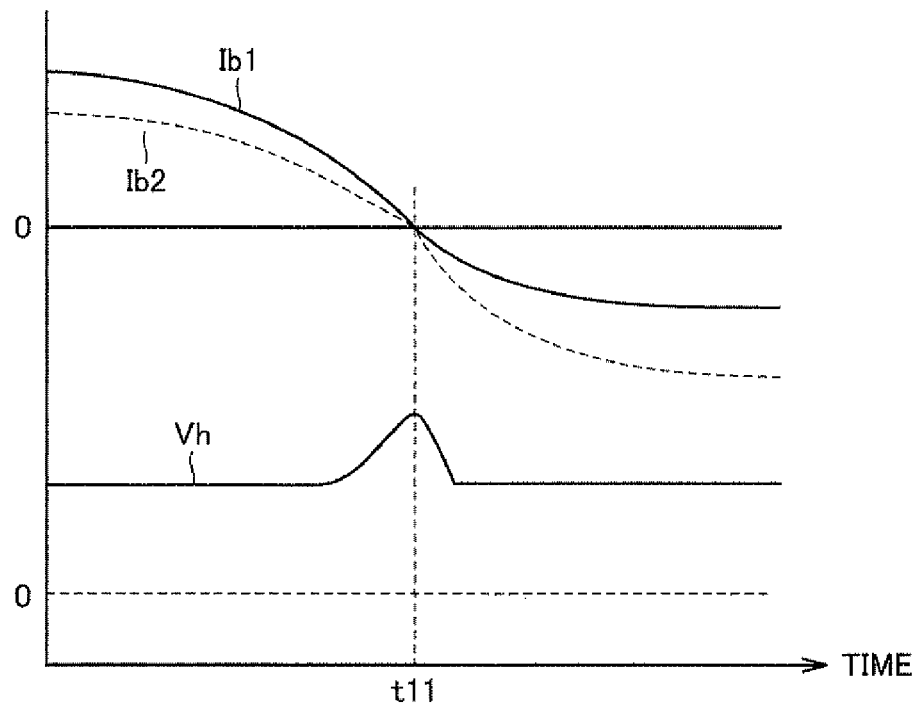
FIG. 4 shows voltage variation when currents flowing through the respective converters simultaneously become close to zero.

Such deviation of duty with respect to a command appears as a difference between a control target value and an actual value, and is corrected by FB control unless the direction of current (electric power) flowing through the converter is reversed. If the direction of current (electric power) flowing through the converter is reversed, however, variation occurs due to following delay of the FB control. Particularly, when the request power required by driving force generation unit 3 becomes close to zero so that currents Ib1, Ib2 through converters 8-1, 8-2 simultaneously become close to zero as shown in FIG. 4, an amount of variation in converter 8-1 and an amount of variation in converter 8-2 are combined with each other, resulting in significant variation in voltage Vh which is an output voltage of converters 8-1, 8-2.

Therefore, in this first embodiment, when the request power required by driving force generation unit 3 becomes equal to or lower than a prescribed threshold value, electric power is fed actively to converters 8-1, 8-2 to prevent the respective amounts of current passage in converters 8-1, 8-2 from simultaneously becoming close to zero. More specifically, converters 8-1, 8-2 are controlled such that electric power is supplied and received between converters 8-1 and 8-2.

Figure 5:
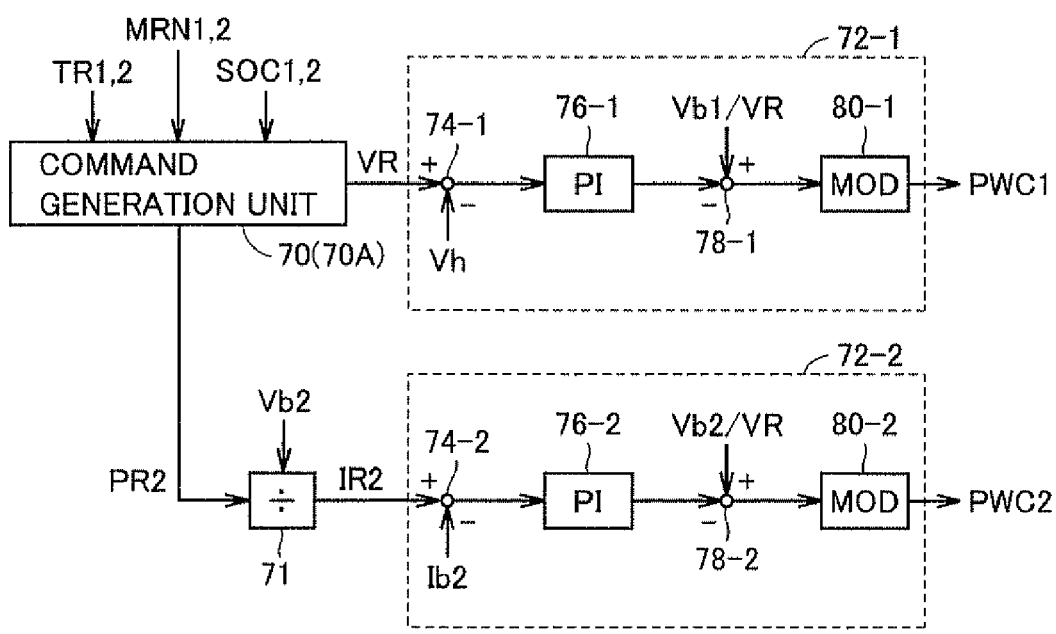
FIG. 5 is a functional block diagram of a converter ECU shown in FIG. 1.

FIG. 5 is a functional block diagram of converter ECU 2 shown in FIG. 1. Referring to FIG. 5, converter ECU 2 includes a command generation unit 70, a voltage control unit 72-1, a division unit 71, and a current control unit 72-2.

Command generation unit 70 calculates request power PR required by driving force generation unit 3 based on torque target values TR1, TR2 and revolution speed target values MRN1, MRN2 from drive ECU 32, and calculates a target voltage VR indicating a target value for voltage Vh between main positive bus MPL and main negative bus MNL based on calculated request power PR.

Command generation unit 70 also calculates an electric power control value PR2 for converter 8-2 subjected to electric power control (current control) based on calculated request power PR. When request power PR required by driving force generation unit 3 is allocated equally to power storage units 6-1 and 6-2, for example, command generation unit 70 calculates half of request power PR as electric power control value PR2 for converter 8-2. It is noted that electric power control value PR2 for converter 8-2 is not limited to half of request power PR. Alternatively, allocation of request power PR to power storage units 6-1 and 6-2 may be determined in consideration of SOCs, temperatures and the like of power storage units 6-1, 6-2, to calculate electric power control value PR2 based on the allocation.

Here, when request power PR is equal to or lower than the prescribed threshold value (close to zero), command generation unit 70 sets electric power control value PR2 for converter 8-2 to a prescribed nonzero value by using a method which will be described later, in order to prohibit the respective amounts of current passage in converters 8-1, 8-2 from simultaneously becoming close to zero.

Since converter 8-2 is subjected to current control (electric power control) based on a target current IR2 calculated from this electric power control value PR2 and converter 8-1 is subjected to voltage control such that voltage Vh attains to target voltage VR as will be described later, when request power PR is equal to or lower than the prescribed threshold value (close to zero), electric power is supplied and received between power storage units 6-1 and 6-2 through converters 8-1, 8-2.

Voltage control unit 72-1 includes subtraction units 74-1, 78-1, a PI control unit 76-1, and a modulation unit 80-1. Subtraction unit 74-1 subtracts voltage Vh from target voltage VR, and outputs the calculation result to PI control unit 76-1. PI control unit 76-1 receives the difference between target voltage VR and voltage Vh and performs a proportional-plus-integral operation, and outputs the operation result to subtraction unit 78-1.

Subtraction unit 78-1 subtracts the output of PI control unit 76-1 from the inverse of a theoretical boost ratio of converter 8-1 which is indicated as (voltage Vb1)/(target voltage VR), and outputs the calculation result to modulation unit 80-1 as a duty command for converter 8-1. Modulation unit 80-1 produces drive signal PWC1 based on the duty command from subtraction unit 78-1 and a carrier wave generated by a not-shown oscillator, and outputs produced drive signal PWC1 to converter 8-1.

Division unit 71 divides electric power control value PR2 for converter 8-2 by voltage Vb2 of power storage unit 6-2, and outputs the calculation result to current control unit 72-2 as target current IR2 for converter 8-2.

Current control unit 72-2 includes subtraction units 74-2, 78-2, a PI control unit 76-2, and a modulation unit 80-2. Subtraction unit 74-2 subtracts current Ib2 from target current IR2, and outputs the calculation result to PI control unit 76-2. PI control unit 76-2 receives the difference between target current IR2 and current Ib2 and performs a proportional-plus-integral operation, and outputs the operation result to subtraction unit 78-2.

Subtraction unit 78-2 subtracts the output of PI control unit 76-2 from the inverse of a theoretical boost ratio of converter 8-2 which is indicated as (voltage Vb2)/(target voltage VR), and outputs the calculation result to modulation unit 80-2 as a duty command for converter 8-2. Modulation unit 80-2 produces drive signal PWC2 based on the duty command from subtraction unit 78-2 and a carrier wave generated by a not-shown oscillator, and outputs produced drive signal PWC2 to converter 8-2.

Figure 6:
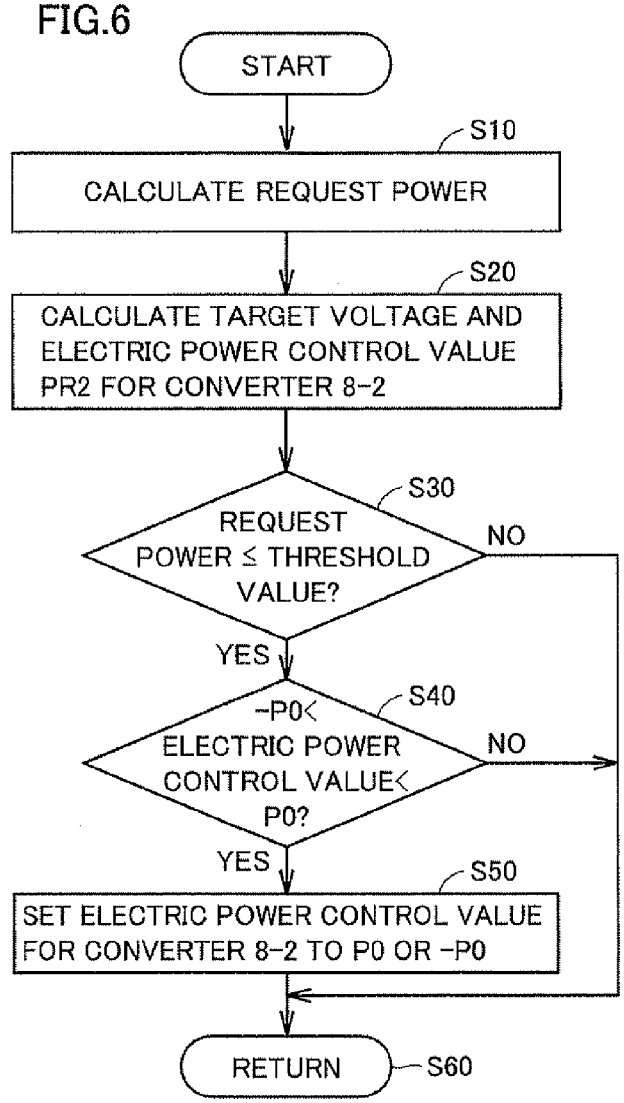
FIG. 6 is a flowchart for explaining a process flow at a command generation unit shown in FIG. 5.

FIG. 6 is a flowchart for explaining a process flow at command generation unit 70 shown in FIG. 5. The process shown in this flowchart is called from a main routine and executed at regular time intervals or when a predetermined condition is satisfied.

Referring to FIG. 6, command generation unit 70 calculates request power PR required by driving force generation unit 3 based on torque target values TR1, TR2 and revolution speed target values MRN1, MRN2 from drive ECU 32 (step S10). Then, command generation unit 70 calculates target voltage. VR for voltage Vh and electric power control value PR2 for converter 8-2 based on calculated request power PR (step S20).

Next, command generation unit 70 determines whether or not request power PR is equal to or lower than the prescribed threshold value (step S30). This threshold value is a value for determining whether or not request power PR is close to zero. If it is determined that request power PR is higher than the threshold value (NO at step S30), the process proceeds to step S60.

If it is determined at step S30 that request power PR is equal to or lower than the threshold value (YES at step S30), command generation unit 70 determines whether or not electric power control value PR2 for converter 8-2 is smaller than a prescribed value P0 ($\neq$0) (step S40). This prescribed value P0 is a value for ensuring an amount of current passage in converter 8-2, and is a relatively small nonzero positive value.

If it is determined that electric power control value PR2 is smaller than prescribed value P0 (YES at step S40), command generation unit 70 sets electric power control value PR2 for converter 8-2 to prescribed value P0 or −P0 in order to prohibit the respective amounts of current passage in converters 8-1, 8-2 from simultaneously becoming close to zero (step S50). On the other hand, if it is determined at step S40 that electric power control value PR2 is equal to or larger than prescribed value P0 (NO at step S40), command generation unit 70 proceeds to step S60.

Figure 7:
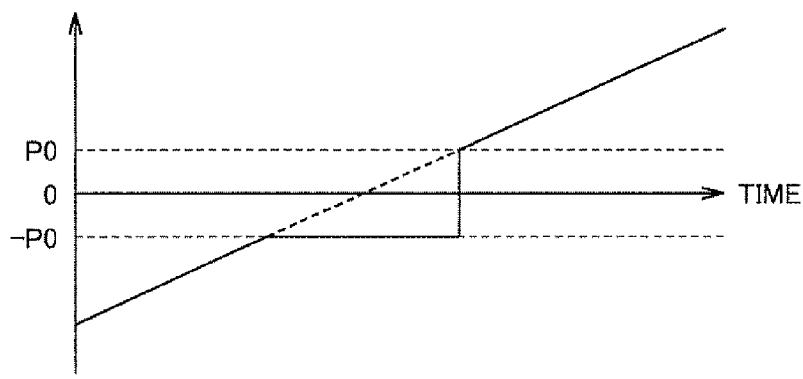
FIG. 7 shows an example of variation in electric power control value for the converter.

FIG. 7 shows an example of variation in electric power control value PR2 for converter 8-2. Referring to FIG. 7, while the electric power control value for converter 8-2 calculated based on request power PR is larger than the prescribed value (−P0) and smaller than prescribed value P0, electric power control value PR2 is fixed to the prescribed value (−P0) rather than to a value calculated based on request power PR.

Alternatively, while the electric power control value for converter 8-2 calculated based on request power PR is larger than the prescribed value (−P0) and smaller than prescribed value P0, electric power control value PR2 may be fixed to prescribed value P0. When electric power control value PR2 is switched from −P0 to P0 (or from P0 to −P0), voltage Vh may be varied, however, with prescribed values P0, −P0 being relatively small values and converter 8-1 operating based on variation in voltage Vh, directions of current through converters 8-1, 8-2 are not reversed simultaneously, and significant voltage variation as shown in FIG. 4 does not occur.

As described above, in this first embodiment, when request power PR required of power supply device 1 by driving force generation unit 3 is close to zero, converters 8-1, 8-2 are controlled to prohibit the respective amounts of current passage in converters 8-1, 8-2 from simultaneously becoming close to zero. That is, when request power PR is close to zero, a current (electric power) is fed actively to converter 8-2 subjected to current control (electric power control) such that electric power is supplied and received between converters 8-1 and 8-2, which prevents the respective amounts of current passage in converters 8-1, 8-2 from simultaneously becoming close to zero. Therefore, according to this first embodiment, variation in voltage Vh can be suppressed.

[Modification of First Embodiment]

In the above first embodiment, when request power PR required by driving force generation unit 3 is close to zero, electric power control value PR2 for converter 8-2 is set to a nonzero value in order to prevent the respective amounts of current passage in converters 8-1, 8-2 from simultaneously becoming close to zero. Here, although electric power is supplied and received between power storage units 6-1 and 6-2 through converters 8-1, 8-2 as the request power required by driving force generation unit 3 is close to zero, a direction of that current flow is not particularly considered in the above first embodiment. In this modification, a direction of electric power supplied and received between power storage units 6-1 and 6-2 is controlled based on the respective SOCs of power storage units 6-1, 6-2.

More specifically, when power storage unit 6-2 has an SOC higher than an SOC of power storage unit 6-1, electric power control value PR2 for converter 8-2 is set to a positive value such that electric power flows from power storage unit 6-2 to power storage unit 6-1. On the other hand, when power storage unit 6-2 has an SOC lower than an SOC of power storage unit 6-1, electric power control value PR2 for converter 8-2 is set to a negative value such that electric power flows from power storage unit 6-1 to power storage unit 6-2.

Figure 8:
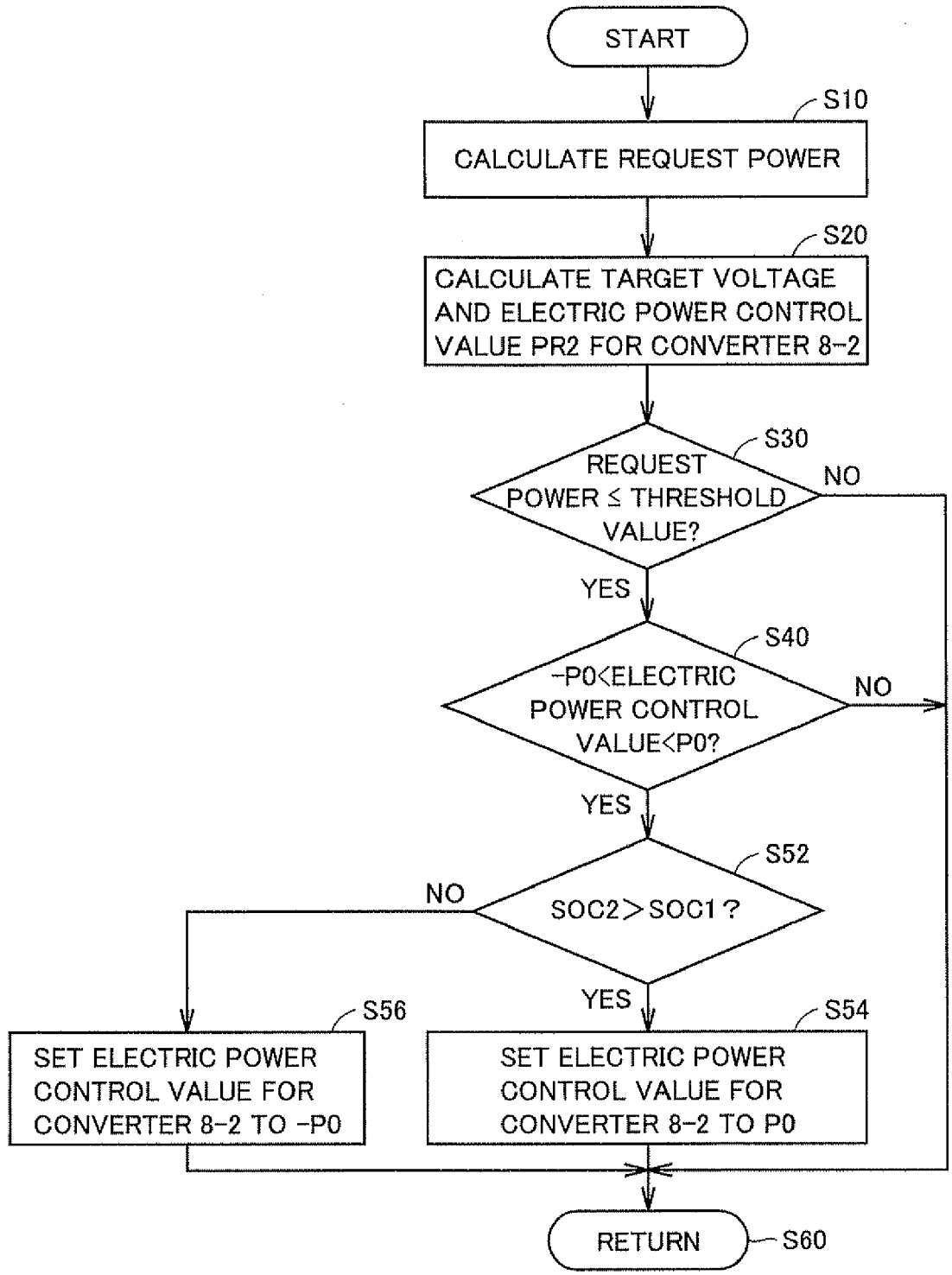
FIG. 8 is a flowchart for explaining a process flow at the command generation unit according to a modification.

FIG. 8 is a flowchart for explaining a process flow at command generation unit 70 according to this modification, Again, the process shown in this flowchart is called from the main routine and executed at regular time intervals or when a predetermined condition is satisfied, Referring to FIG. 8, this flowchart includes steps S52, S54, S56 instead of step S50 in the flowchart shown in FIG. 6, That is, if it is determined at step S40 that electric power control value PR2 is smaller than prescribed value P0 (YES at step S40), command generation unit 70 compares state amounts SOC1, SOC2 of power storage units 6-1, 6-2 from battery ECU 4 (FIG. 1) with each other (step S52).

If it is determined that state amount SOC2 indicating the SOC of power storage unit 6-2 is higher than state amount SOC1 indicating the SOC of power storage unit 6-1 (YES at step S52), command generation unit 70 sets electric power control value PR2 for converter 8-2 to prescribed value PO (positive value) (step S54). As a result, electric power flows from power storage unit 6-2 having a relatively high SOC to power storage unit 6-1 having a low SOC.

On the other hand, if it is determined at step S52 that state amount SOC2 is equal to or lower than state amount SOC1 (NO at step S52), command generation unit 70 sets electric power control value PR2 for converter 8-2 to the prescribed value (−P0) (negative value) (step S56). As a result, electric power flows from power storage unit 6-1 having a relatively high SOC to power storage unit 6-2 having a low SOC.

According to this modification, electric power flows from a power storage unit having a relatively high SOC to a power storage unit having a low SOC, thereby preventing overcharge or over discharge to/from power storage units 6-1, 6-2.

[Second Embodiment]

In the first embodiment, when request power PR required by driving force generation unit 3 is close to zero, a current (electric power) is fed actively to converter 8-2 subjected to current control (electric power control), thus preventing the respective amounts of current passage in converters 8-1, 8-2 from simultaneously becoming close to zero. In this second embodiment, when request power PR becomes close to zero, the amounts of current passage in converters 8-1, 8-2 (rates of charge and discharge to/from power storage units 6-1, 6-2) are made different from each other, thus preventing the respective amounts of current passage in converters 8-1, 8-2 from simultaneously becoming close to zero.

Figure 9:
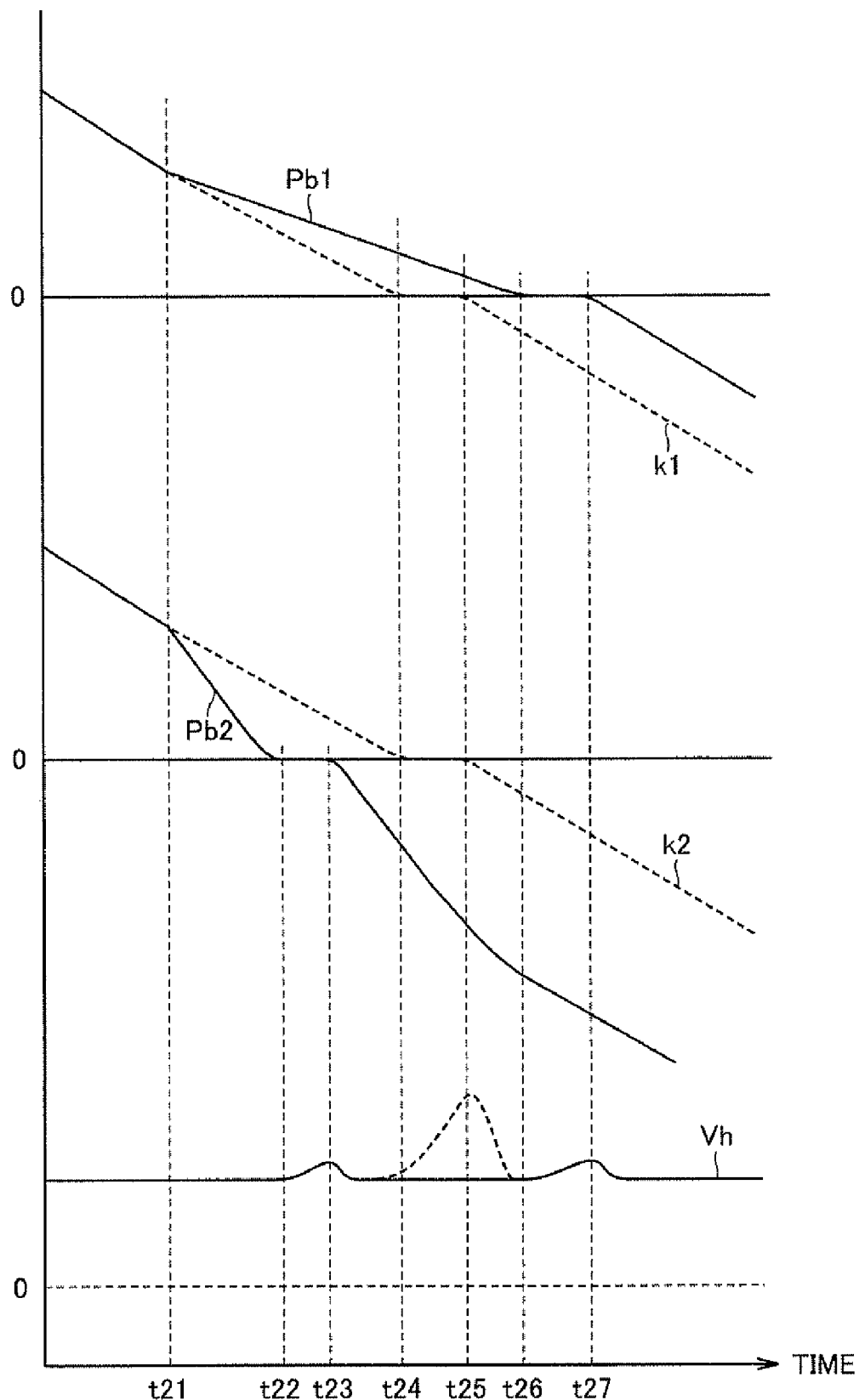
FIG. 9 illustrates a concept of current passage in each converter according to a second embodiment.

FIG. 9 illustrates a concept of current passage in each of converters 8-1, 8-2 according to the second embodiment. Referring to FIG. 9, charge and discharge powers to/from power storage units 6-1, 6-2, i.e., current passage powers in converters 8-1, 8-2, respectively, are denoted with Pb1, Pb2, respectively. When power storage unit 6-1 (6-2) discharges, Pb1 (Pb2) is set to a positive value, and when power storage unit 6-1 (6-2) is charged, Pb1 (Pb2) is set to a negative value. For comparison, variations in power of current passage in converters 8-1, 8-2 and voltage Vh with a conventional technique are shown by dotted lines.

In this second embodiment, when request power PR required by driving force generation unit 3 is not close to zero, electric power control value PR2 for converter 8-2 is determined such that the powers of current passage in converters 8-1, 8-2 are equal to each other (namely, request power PR is equally allocated to power storage units 6-1 and 6-2). Then, when request power PR required by driving force generation unit 3 becomes equal to or lower than a prescribed threshold value at time t21, the amount of current passage in converter 8-2 subjected to current control (electric power control) is changed. That is, electric power control value PR2 for converter 8-2 is changed such that the powers of current passage in converters 8-1, 8-2 (rates of charge and discharge to/from power storage units 6-1, 6-2) are different from each other.

Consequently, the amount of current passage in converter 8-1 and the amount of current passage in converter 8-2 are prevented from simultaneously becoming close to zero, to prevent an amount of variation in voltage Vh that occurs when the amount of current passage in converter 8-1 becomes close to zero and an amount of variation in voltage Vh that occurs when the amount of current passage in converter 8-2 becomes close to zero from being combined with each other, thereby suppressing variation in voltage Vh.

A general structure of the vehicle according to this second embodiment is the same as that of vehicle 100 according to the first embodiment shown in FIG. 1. In addition, a general configuration of the converter ECU according to the second embodiment is the same as that of converter ECU 2 according to the first embodiment shown in FIG. 5.

Figure 10:
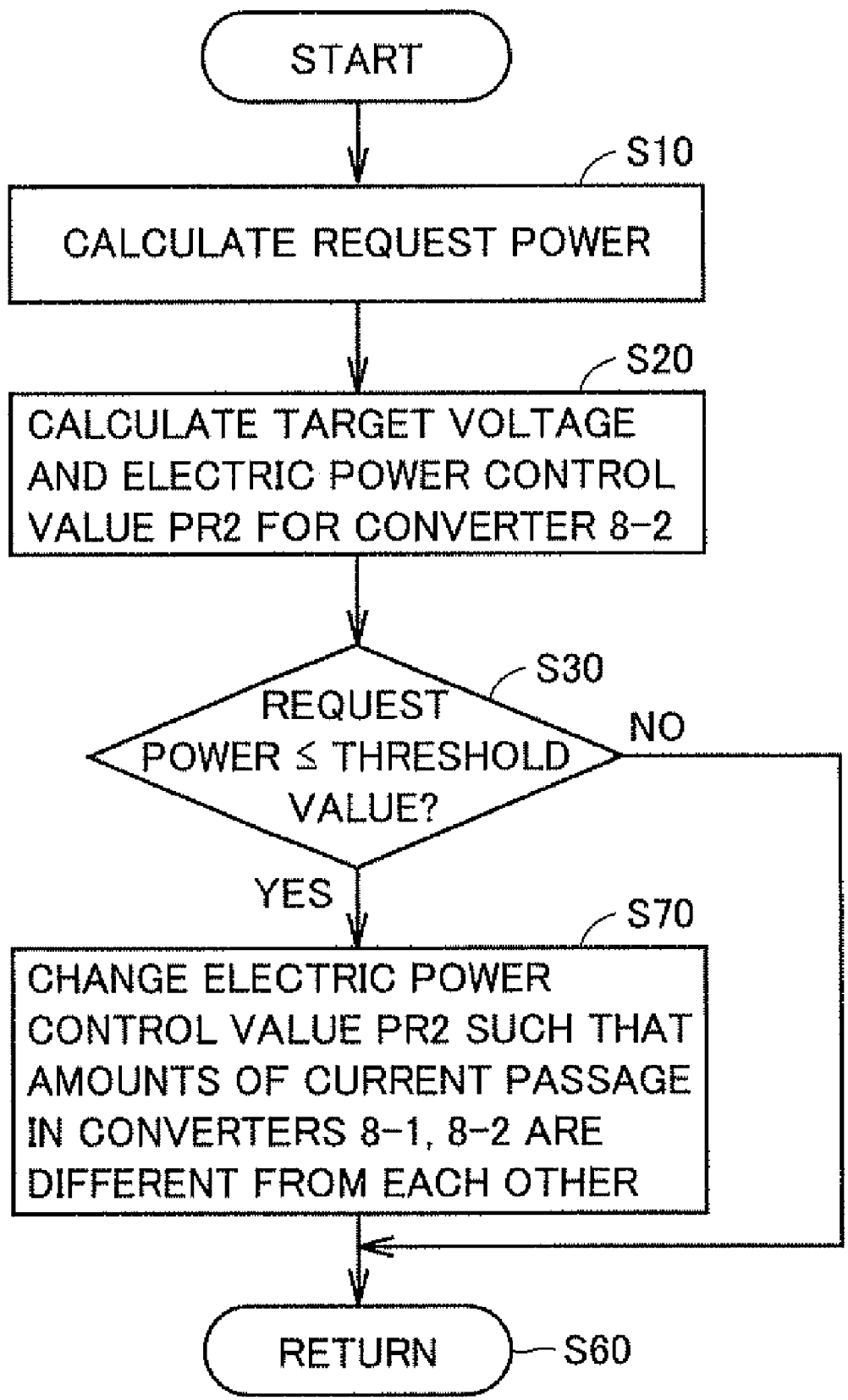
FIG. 10 is a flowchart for explaining a process flow at the command generation unit in the converter ECU according to the second embodiment.

FIG. 10 is a flowchart for explaining a process flow at a command generation unit 70A in converter ECU 2 according to the second embodiment. Again, the process shown in this flowchart is called from the main routine and executed at regular time intervals or when a predetermined condition is satisfied.

Referring to FIG. 10, this flowchart includes a step S70 instead of steps S40, S50 in the flowchart shown in FIG. 6. That is, if it is determined at step S30 that request power PR required by driving force generation unit 3 is equal to or lower than the threshold value (YES at step S30), command generation unit 70A changes electric power control value PR2 for converter 8-2 such that the amounts of current passage in converters 8-1, 8-2 are different from each other.

That is, when request power PR is higher than the threshold value, command generation unit 70A determines electric power control value PR2 for converter 8-2 based on request power PR such that the amounts of current passage in converters 8-1, 8-2 are equal to each other. Then, when request power PR becomes equal to or lower than the threshold value, command generation unit 70A changes electric power control value PR2 for converter 8-2 such that power of current passage Pb2 in converter 8-2 is lower than power of current passage Pb1 in converter 8-1, as shown in FIG. 9, for example. Alternatively, electric power control value PR2 for converter 8-2 may be changed such that power of current passage Pb2 in converter 8-2 is higher than power of current passage Pb1 in converter 8-1.

As described above, in this second embodiment, when request power PR required by driving force generation unit 3 becomes close to zero, electric power control value PR2 for converter 8-2 is changed such that the amounts of current passage in converters 8-1, 8-2 are different from each other, thereby preventing the respective amounts of current passage in converters 8-1, 8-2 from simultaneously becoming close to zero. Therefore, according to this second embodiment, variation in voltage Vh can again be suppressed.

[Modification of Second Embodiment]

In this modification, electric power control value PR2 for converter 8-2 is changed based on respective SOCs of power storage units 6-1, 6-2. More specifically, when power storage unit 6-2 has an SOC higher than an SOC of power storage unit 6-1, electric power control value PR2 for converter 8-2 is changed such that power of current passage Pb2 (during discharge: positive, during charge: negative) in converter 8-2 is higher than power of current passage Pb1 in converter 8-1. On the other hand, when power storage unit 6-2 has an SOC lower than an SOC of power storage unit 6-1, electric power control value PR2 for converter 8-2 is changed such that power of current passage Pb2 in converter 8-2 is lower than power of current passage Pb1 in converter 8-1.

Figure 11:
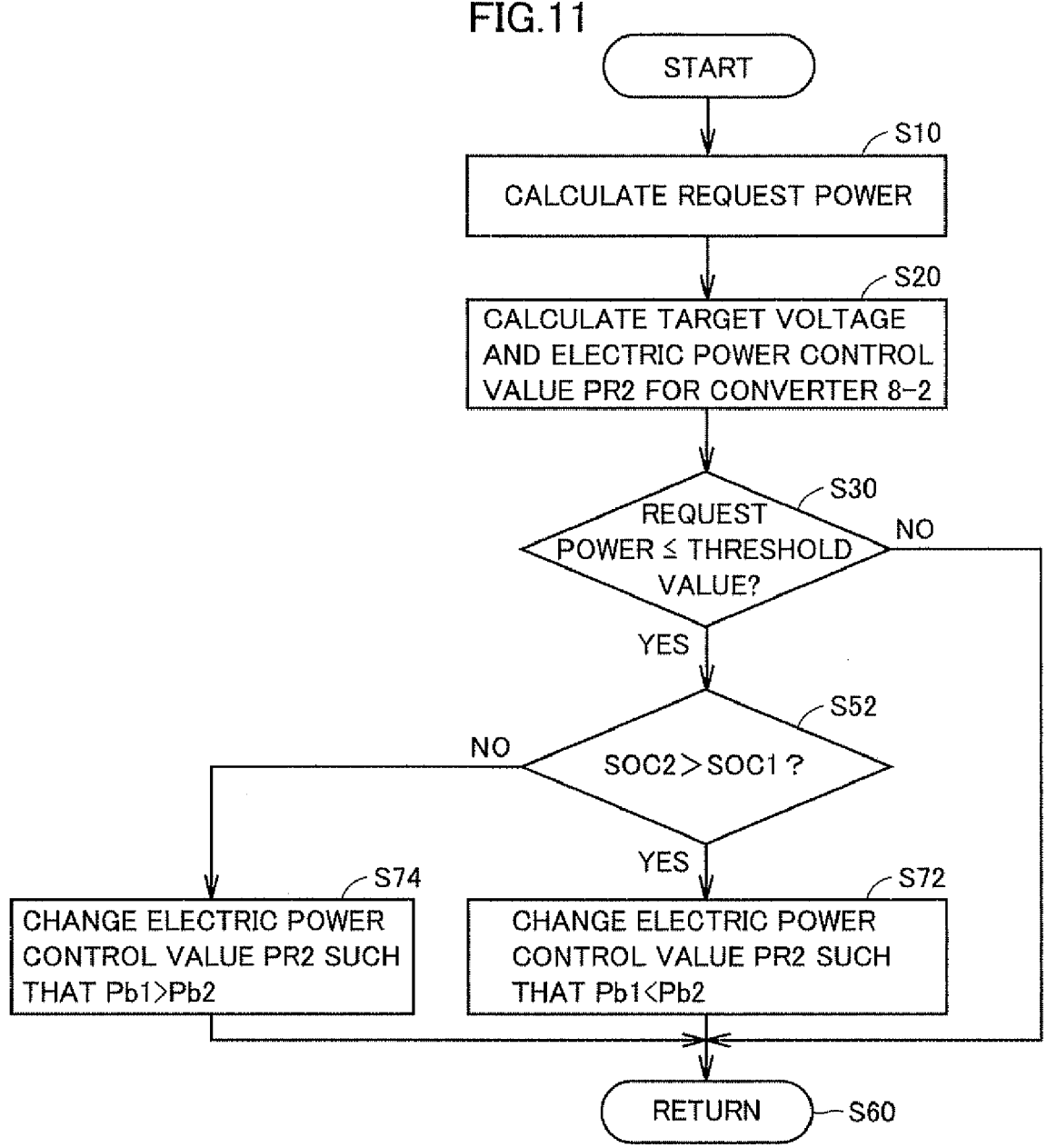
FIG. 11 is a flowchart for explaining a process flow at the command generation unit according to a modification of the second embodiment.

FIG. 11 is a flowchart for explaining a process flow at command generation unit 70A according to the modification of the second embodiment. Again, the process shown in this flowchart is called from the main routine and executed at regular time intervals or when a predetermined condition is satisfied.

Referring to FIG. 11, this flowchart includes steps S52, S72, S74 instead of step S70 in the flowchart shown in FIG. 10. That is, if it is determined at step S30 that request power PR required by driving force generation unit 3 is equal to or lower than the threshold value (YES at step S30), command generation unit 70A compares state amounts SOC1, SOC2 of power storage units 6-1, 6-2 from battery ECU 4 (FIG. 1) with each other (step S52).

If it is determined that state amount SOC2 indicating the SOC of power storage unit 6-2 is higher than state amount SOC1 indicating the SOC of power storage unit 6-1 (YES at step S52), command generation unit 70A changes electric power control value PR2 for converter 8-2 such that power of current passage Pb2 (during discharge: positive, during charge: negative) in converter 8-2 is higher than power of current passage Pb1 in converter 8-1 (step S72).

On the other hand, if it is determined at step S52 that state amount SOC2 is equal to or lower than state amount SOC1 (NO at step S52), command generation unit 70A changes electric power control value PR2 for converter 8-2 such that power of current passage Pb2 in converter 8-2 is lower than power of current passage Pb1 in converter 8-1 (step S74).

According to this modification, when request power PR required by driving force generation unit 3 is equal to or lower than the threshold value, the respective amounts of current passage in converters 8-1, 8-2 are prevented from simultaneously becoming close to zero, thereby suppressing variation in voltage Vh and preventing significant difference in SOC between power storage units 6-1 and 6-2.

Although two power storage units and two converters are provided in each of the aforementioned embodiments, three or more power storage units and three or more converters may be provided.

Figure 12:
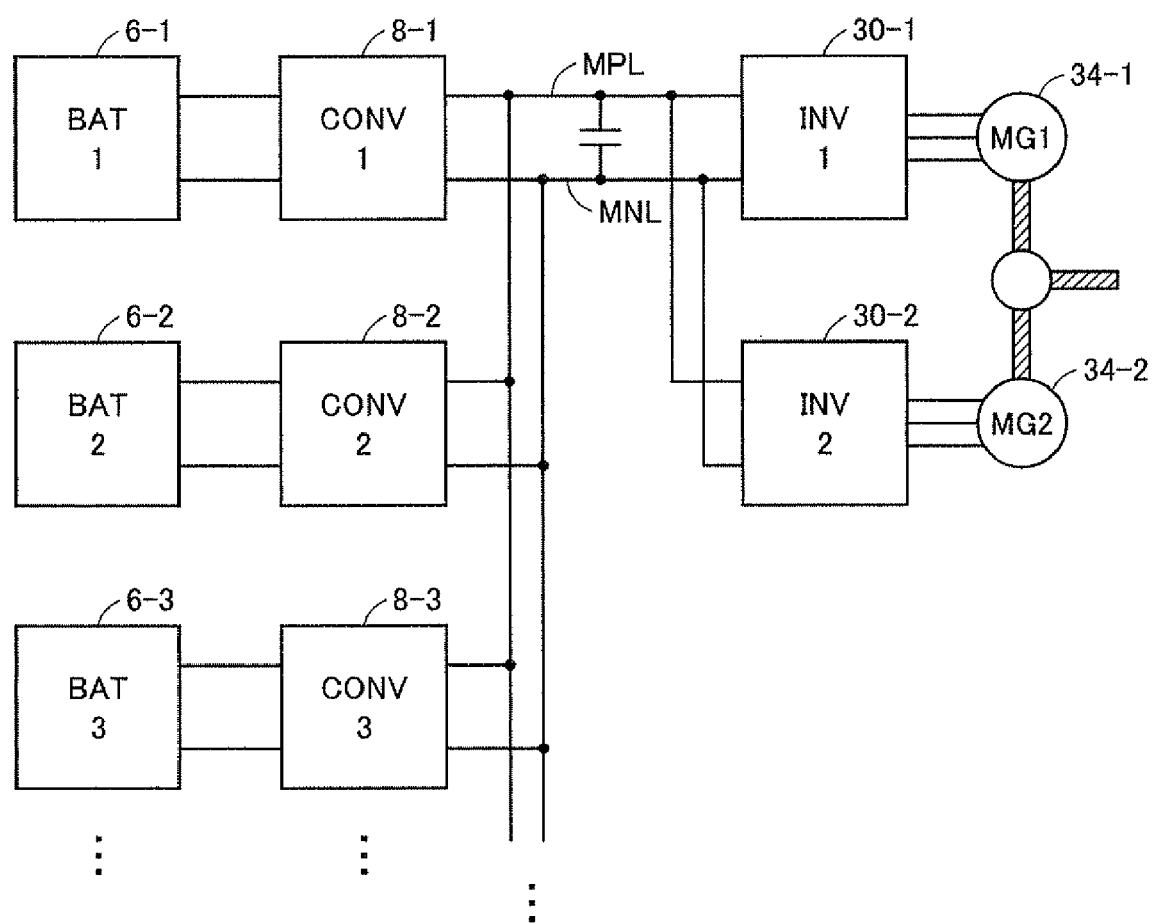
FIG. 12 is a general block diagram of a vehicle incorporating a power supply device including three or more power storage units and three or more converters.

FIG. 12 is a general block diagram of a vehicle incorporating a power supply device including three or more power storage units and three or more converters. Referring to FIG. 12, this vehicle 100A further includes a power storage unit and a corresponding converter in the structure of vehicle 100 shown in FIG. 1. In FIG. 12, a power storage unit 6-3 and a converter 8-3 are provided by way of example.

Power storage unit 6-3 is a DC power supply that can be charged and discharge, and includes a secondary battery such as a nickel-metal hydride secondary battery or a lithium-ion secondary battery. Power storage unit 6-3 is connected to converter 8-3. Converter 8-3 is provided between power storage unit 6-3 and main positive bus MPL, main negative bus MNL. As in the case of converter 8-2, converter 8-3 is subjected to current control (electric power control) by converter ECU 2. When request power PR required by the vehicle is equal to or lower than a prescribed threshold value (close to zero), converters 8-1 to 8-3 are controlled to prevent respective amounts of current passage in converters 8-1 to 8-3 from simultaneously becoming close to zero.

The remaining structure of vehicle 100A is the same as that of vehicle 100 shown in FIG. 1.

In each of the aforementioned embodiments, the control by converter ECU 2 is actually performed by a CPU (Central Processing Unit). The CPU reads a program including the control structure shown in FIG. 5 and the steps in the flowcharts shown in FIGS. 6, 8, 10, and 11 from a ROM (Read Only Memory) and executes the read program, to execute the process in accordance with the control structure shown in FIG. 5 and the flowcharts shown in FIGS. 6, 8, 10, and 11. The ROM thus corresponds to a computer (CPU)-readable recording medium having the program including the control structure shown in FIG. 5 and the steps in the flowcharts shown in FIGS. 6, 8, 10, and 11 recorded thereon.

Although converter 8-1 is subjected to voltage control and converter 8-2 is subjected to current control (electric power control) in each of the aforementioned embodiments, converter 8-1 may be subjected to current control (electric power control), and converter 8-2 may be subjected to current control (electric power control).

Further, the present invention is applicable to electric-powered vehicles in general such as hybrid vehicles including an engine as a driving source, electric vehicles not including an engine but running only with electric power, and fuel cell cars further including a fuel cell as a power supply.

Furthermore, although converter ECU 2 and battery ECU 4 are structured as separate control devices in each of the aforementioned embodiments, converter ECU 2 and battery ECU 4 and further drive ECU 32 may be structured as a single ECU.

In the above description, main positive bus MPL and main negative bus MNL correspond to an embodiment of "electric power lines" in the present invention, and driving force generation unit 3 corresponds to an embodiment of a "load device" in the present invention. Additionally, converters 8-1 to 8-3 correspond to an embodiment of "a plurality of voltage conversion units" in the present invention, and voltage control unit 72-1 and current control unit 72-2 in converter ECU 2 constitute an embodiment of "control units" in the present invention.

Additionally, battery ECU 4 corresponds to an embodiment of a "state-of-charge estimation unit" in the present invention. Further, at least one of inverters 30-1, 30-2 corresponds to an embodiment of a "driving device" in the present invention, and at least one of motor generators 34-1, 34-2 corresponds to an embodiment of a "motor" in the present invention.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

The invention claimed is:

1. A power supply device for supplying and receiving electric power to and from a load device via an electric power line, comprising:
    a plurality of power storage units that can be charged and discharge;
    a plurality of voltage conversion units provided correspondingly to said plurality of power storage units, each including a DC chopper circuit capable of performing bidirectional voltage conversion between a corresponding one of said power storage units and said electric power line;
    a control unit for controlling one of said plurality of voltage conversion units such that a voltage of said electric power line attains to a target voltage, and controlling remaining voltage conversion unit(s) such that an amount of current passage in said remaining voltage conversion unit(s) attains to a target value; and
    a command generation unit for generating said target voltage, and generating the target value for said amount of current passage based on request power required by said load device, wherein
    said command generation unit sets the target value for the amount of current passage in said remaining voltage conversion unit(s) to a prescribed nonzero value only when said request power is equal to or lower than a reference value.

2. The power supply device according to claim 1, further comprising:
    a state-of-charge estimation unit for estimating a state of charge of each of said plurality of power storage units, wherein
    when said request power is equal to or lower than said reference value, said command generation unit sets the target value for said amount of current passage such that electric power flows from the power storage unit relatively high in a state amount indicating said state of charge to the power storage unit relatively low in said state amount.

3. The power supply device according to claim 1, wherein
    when said request power is equal to or lower than said reference value, said command generation unit sets the target value for said amount of current passage such that respective amounts of current passage in said plurality of voltage conversion units are different from one another.

4. A vehicle comprising:
    the power supply device according to claim 1;
    a driving device for receiving supply of electric power from said power supply device;
    a motor driven by said driving device; and
    a wheel driven by said motor.

5. A vehicle comprising:
    the power supply device according to claim 2;
    a driving device for receiving supply of electric power from said power supply device;
    a motor driven by said driving device; and
    a wheel driven by said motor.

6. A vehicle comprising:
    the power supply device according to claim 3;
    a driving device for receiving supply of electric power from said power supply device;
    a motor driven by said driving device; and
    a wheel driven by said motor.

7. A control method for a power supply device for supplying and receiving electric power to and from a load device via an electric power line,
    said power supply device including
        a plurality of power storage units that can be charged and discharge, and
        a plurality of voltage conversion units provided correspondingly to said plurality of power storage units, each including a DC chopper circuit capable of performing bidirectional voltage conversion between a corresponding one of said power storage units and said electric power line,
        one of said plurality of voltage conversion units being controlled such that a voltage of said electric power line attains to a target voltage, and remaining voltage conversion unit(s) being controlled such that an amount of current passage in said remaining voltage conversion unit(s) attains to a target value,
    said control method comprising the steps of:
    generating said target voltage, and generating the target value for said amount of current passage based on request power required by said load device;
    determining whether or not said request power is equal to or lower than a reference value; and
    setting the target value for the amount of current passage in said remaining voltage conversion unit(s) to a prescribed nonzero value only when it is determined that said request power is equal to or lower than said reference value.

8. The control method for a power supply device according to claim 7, further comprising the step of:
    estimating a state of charge of each of said plurality of power storage units, wherein
    at said step of setting the target value for the amount of current passage, the target value for said amount of current passage is set such that electric power flows from the power storage unit relatively high in a state amount indicating said state of charge to the power storage unit relatively low in said state amount.

9. The control method for a power supply device according to claim 7, wherein
    at said step of setting the target value for the amount of current passage, the target value for said amount of current passage is set such that respective amounts of current passage in said plurality of voltage conversion units are different from one another.

10. A computer-readable recording medium having recorded thereon a program for causing a computer to execute the control method for the power supply device according to claim 7.

11. A computer-readable recording medium having recorded thereon a program for causing a computer to execute the control method for the power supply device according to claim 8.

12. A computer-readable recording medium having recorded thereon a program for causing a computer to execute the control method for the power supply device according to claim 9.

* * * * *